United States Patent [19]
Clark

[11] 3,842,513
[45] Oct. 22, 1974

[54] LEVELING INSTRUMENT

[76] Inventor: Edward S. Clark, 3210 Guido St., Oakland, Calif. 94602

[22] Filed: June 22, 1972

[21] Appl. No.: 265,153

[52] U.S. Cl. .................................. 33/367, 137/39
[51] Int. Cl. .......................... G01c 5/04, G01c 9/22
[58] Field of Search .............................. 33/367, 377

[56] References Cited
UNITED STATES PATENTS

| | | | |
|---|---|---|---|
| 124,389 | 3/1872 | Rohrer | 33/367 |
| 762,072 | 6/1904 | Lord | 33/367 |
| 872,183 | 11/1907 | Jenning | 33/367 |
| 1,060,602 | 5/1913 | Jenning | 33/367 |
| 1,566,174 | 12/1925 | Tyler | 33/367 |
| 3,443,319 | 5/1969 | Dooley | 33/367 X |

Primary Examiner—Louis R. Prince
Assistant Examiner—Charles E. Phillips
Attorney, Agent, or Firm—Joseph B. Gardner

[57] ABSTRACT

Leveling apparatus for use in establishing the level or relative elevations of one location with respect to another separated therefrom. The apparatus includes a plurality of static-pressure tube or gage assemblies respectively provided with flow passages therein. One of the assemblies is a reference component intended to be disposed at one such location, usually the location with respect to which the other is to be leveled. Another of the assemblies is an indicator component adapted to be disposed at the location to be leveled and includes visual observation means enabling the relative levels of the two locations to be visually determined. A length of flexible tubing extends between the reference and indicator components or assemblies in open communication with the flow passage means therein, and a body of liquid fills the tubing and extends into the flow passage means to provide the leveling medium for the apparatus. Each of the assemblies includes structure in the form of a balloon-like diaphragm in one embodiment of the invention and in the form of a selectively operable valve in another embodiment of the invention for inhibiting escape of liquid from the assemblies into the ambient environment and also for normally maintaining substantially ambient pressures upon the body of liquid within the flow passage means. Air-confinement means is provided in each of the assemblies for resisting escape of air into the flow passage means and tubing from the ambient pressures normally acting upon the body of liquid whenever the assemblies are displaced from the upright positions of use thereof. In certain embodiments of the invention the air-confinement means takes the form of selectively operable valve structure, and in other embodiments of the invention it may take the form of air separation chambers operative to trap air bubbles therein and thereby prevent entrainment thereof within the body of liquid whenever the assemblies are displaced from the upright positions of use thereof.

14 Claims, 8 Drawing Figures

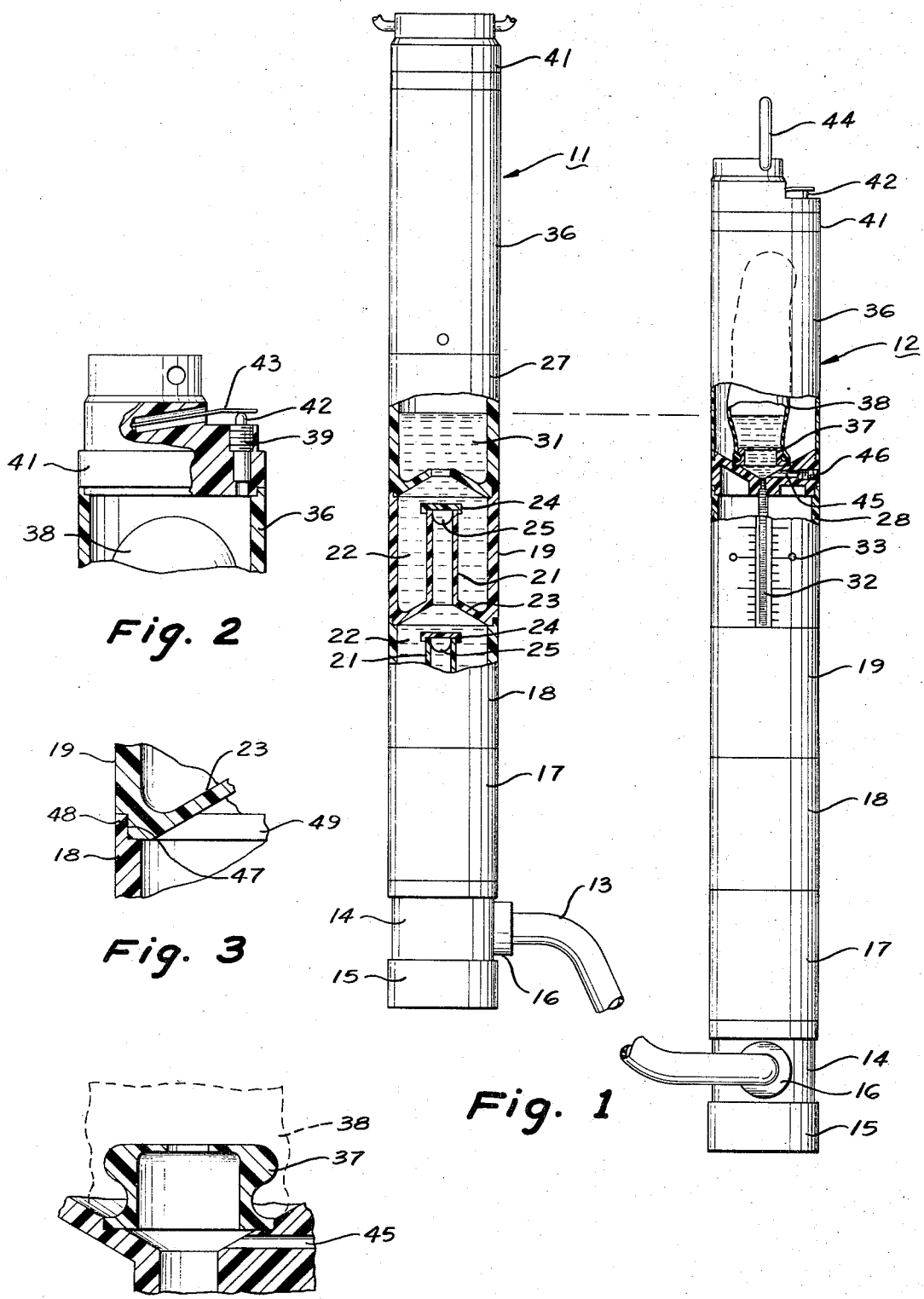

LEVELING INSTRUMENT

This invention relates to leveling apparatus and, more particularly, to apparatus having a plurality of static-pressure tube assemblies hydraulically interconnected via a length of flexible tubing such that two rather remote points may be leveled one against the other.

In the construction of large buildings and other structures, foundations must be laid, floor elevations established, side walls erected, etc., all requiring certain points or locations (such as corners) to be level with respect to each other. Since many building structures have poured concrete foundations, various reference points about the building site, and which are often remote from each other, must be leveled to a master grade so that forms can be erected and made level prior to the pouring of the concrete; and after the foundation has set and the forms removed, it may be necessary or desirable to recheck the various points therealong to determine any possible errors which may exist in the level and what compensation may be required therefor in the subsequent structure that will rest on the foundation.

Establishing the relative elevations or level of two or more widely spaced points along a large building foundation or the like often presents problems since an ordinary carpenter's level is hopelessly inadequate for such a task; and the use of surveying equipment such as a transit and rod in determining the relative levels of various points of a construction site, although accurate, is expensive to own and may be used only two or three times (for initially establishing level points and for rechecking the finished foundation) on an extensive construction project. Furthermore, leveling by use of a transit or the like requires workmen who must be rather skilled in the handling and operation of equipment of this type, and it is also both time consuming and frequently very troublesome to set up and use such equipment.

In view of the foregoing, it is an object of this invention to provide an improved system for determining the respective levels or relative elevations of two or more spaced apart points; and it is a more particular object to provide a leveling system that is inexpensive, small and compact, and which can be operated by only one man who need have no particular skills in the use of surveying or leveling equipment.

Another object of the present invention is in the provision of an improved leveling system wherein a plurality of static-pressure tube or gage assemblies respectively having flow passage means therein are connected by a length of hose or tubing to establish flow communication between the passage means, and wherein a body or mass of liquid fills the tubing and extends into the flow passage means to define the leveling medium for the system.

Still another object is that of providing an improved leveling apparatus or system of the character described for use in establishing the level of one location with respect to another separated therefrom, and which apparatus includes structure in each of the static-pressure tube assemblies for inhibiting escape of liquid therefrom into the ambient environment and also for normally maintaining substantially ambient pressure upon the body of liquid within each of the flow passage means; and which apparatus further includes air-confinement means provided by each of the assemblies for resisting escape of air into the flow passage means and interconnecting tubing from the ambient pressures normally acting upon the body of liquid whenever the assemblies are displaced from the upright positions of use thereof.

A further object of the invention is to provide improved leveling apparatus of the type described that in certain forms thereof have means for equalizing the pressures acting upon the free surfaces of the body of liquid within the tubing and static-pressure assemblies; that has automatically operable valve structure effective to limit upward or outward movement of the liquid within the flow passages of the tube assemblies, thereby enabling the apparatus to accommodate substantial elevational imbalance of the assemblies such as when one is carried to a higher-story elevation on a building structure than the other; that includes valve mechanisms effective to confine the liquid body to a predetermined location even though the assemblies may be placed on their sides or inverted from the normal upright positions thereof; and that includes means for accommodating temperature-induced expansions and contractions of the liquid body without significantly changing the accuracy of the instrument.

Still a further object is in the provision of valve structure of particular design and configuration that functions selectively and automatically as a check valve to prevent liquid flow therepast in a certain direction under particular conditions of the apparatus and in other conditions thereof provides free fluid movement therepast in either direction.

Still another object is that of providing apparatus as described having air-entrapment structure effective to permit air bubbles to rise from the liquid body whenever the assemblies are in the upright positions of use thereof, and which tends to trap air and thereby confine the same whenever the assemblies are in other positions (on their sides or inverted, for example) so as to prevent air bubbles from migrating into and along the tubing that flow-interconnects the static-pressure gage assemblies.

Yet a further object is to provide static-pressure tube or gage assemblies which are fabricated from a plurality of individual structural units adapted to be seated one upon another in stacked succession and joined such as by welding (solvent-welding or sonic-welding, for example) so as to integrate the same into a structural entity.

The various features, objects, and advantages of the present invention heretofore noted, as well as additional objects and advantages thereof especially as concerns characteristics of a particular nature, will become apparent upon a consideration of the following description taken in connection with the accompanying drawings which illustrate exemplary embodiments of the invention. The views of the drawings are as follows:

FIG. 1 is a side view in elevation of leveling apparatus embodying the present invention, portions of the illustrated static-pressure tube assemblies being broken away and shown in section;

FIG. 2 is an enlarged, fragmentary vertical sectional view showing the valve used to vent the upper end portion of the assemblies shown in FIG. 1;

FIG. 3 is an enlarged, fragmentary vertical sectional view illustrating one of the joints between successive sections forming the assemblies illustrated in FIG. 1;

FIG. 4 is an enlarged, fragmentary vertical sectional view of the lower end portion of the upper diaphragm-containing section of each of the assemblies illustrated in FIG. 1;

Figure 8:
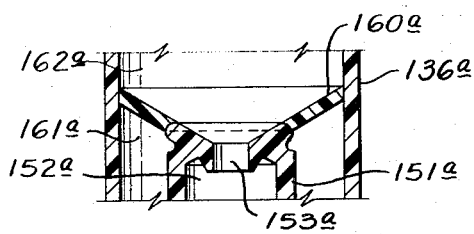
FIG. 8 is a broken vertical sectional view of the upper section of a further modified leveling apparatus.

The embodiment of the invention illustrated in FIG. 1 includes a plurality of static-pressure tube assemblies one of which is a reference or reservoir assembly 11 and the other of which is an indicator or gage assembly 12. The assemblies 11 and 12 are connected by a length of conduit or flexible tubing 13 which communicates with flow passage means respectively provided within such assemblies (as will be explained in greater detail hereinafter) so as to flow interconnect the same. The leveling apparatus comprising the assemblies or components 11 and 12 together with the tubing 13 is shown in FIG. 1 in the normal operating position thereof in which the assemblies are upright or generally vertical. During storage and transport the assemblies 11 and 12 may be displaced in generally horizontal positions and at times may be inverted so that the upper ends thereof face downwardly. In describing the components of the apparatus and function thereof, it will be convenient to assume that the assemblies 11 and 12 are in the upright positions illustrated so that certain of the parts thereof may be referenced to others as being either above or below the same. Similarly, the movement of liquid within the assemblies 11 and 12 may be referenced to generally vertical displacements in upward and downward directions.

The assemblies 11 and 12 are generally similar structurally, and are fabricated in sections which are individually molded of plastic and then positioned or stacked one upon another to form elongated cylindrical bodies comprised by the gage assemblies. The lower connector sections 14 are identical in both assemblies and include a base or end closure 15 and a coupling 16 for securing the tubing 13 to the assemblies in flow communication with the interiors thereof. Above the lower section 14 are stacked three air or gas confinement means in the form of separation sections 17, 18, and 19, there being three such sections in each assembly. The air separation sections may all be identical in structure and function, and include an inner flow tube 21 extending upwardly within and coaxial with a larger entrapment chamber 22. The inner tube 21 is flared outwardly into a bell-shaped bottom 23, such that the lower end of each tube 21 communicates directly with the larger chamber of the next underlying section. Each tube 21 is covered by a cap 24, and it has a port or opening 25 immediately below the cap communicating with the surrounding outer chamber 22.

Any air or gas bubbles that may be entrained in the liquid body defining the leveling medium for the apparatus will tend to rise, and will pass successively from one section upwardly into the flow tube 21 of the next higher section after first exiting each flow tube via the port 25 therein and entering the associated outer chamber 22 from which the bubbles will be directed into the inner tube of the next higher chamber through the inverted cone-shaped lower end of such tube. If an assembly is upset and comes to reset on its side in a horizontal orientation, or if it is inverted, the air separation sections 17, 18, and 19 will trap and hold the air in pockets formed in the horizontal or inverted outer chambers 22; and will thereby prevent the air from passing into the tube 13. Evidently, air pockets within the tube 13 could destroy the accuracy of this leveling apparatus. The air separation chambers tend to confine the air by resisting escape thereof into the tubing even when the assemblies are upset or inverted. After an upset, the gage assemblies may be again placed in upright positions and the air entrapped in the various pockets within the chambers 22 will immediately move upwardly in the manner described.

A reservoir section 27 is positioned over the uppermost air separation section 19 of the assembly 11; and an observation section 28 is positioned over the uppermost air separation section 19 of the assembly 12. The section 27 contains a space or chamber 31 that is normally partially filled with the body of leveling liquid. The observation section 28 is a generally transparent hollow plastic or glass cylinder, and a similarly transparent flow tube 32 extends therethrough, thereby enabling the level of the liquid within the tube to be observed. A scale or level indicia 33 is associated with the tube 32, and it may be located within the hollow interior of the section 28, as shown, or provided thereon. Since it is only necessary to observe the level of the liquid in the indicator or gage assembly 12, the reservoir section 27 need not be transparent. It will be appreciated that as one assembly is raised or lowered with respect to the other, the leveling surface of the body of liquid within the assemblies and tube 13 will rise or fall (as the case may be) within the tube 32 and along the scale 33, thereby providing a visual observation by means of which the relative elevations of the assemblies can be determined.

For proper and accurate operation of the apparatus, the pressure acting upon the free upper surfaces, respectively located within the assemblies 11 and 12 should be equal, and equality is obtained in the present apparatus by providing atmospheric pressure on each surface. For this purpose, a diaphragm chamber 36 is positioned over each of the chambers 27 and 28 in the assemblies 11 and 12, and each diaphragm chamber is provided with a connector 37 (shown best in FIG. 4) to which a balloon-like diaphragm 38 is attached at its lower, band-equipped end to extend upwardly therefrom. The interior of each balloon or diaphragm communicates (via the connector 37) with the top of the reservoir and observation sections 27 and 28. The diaphragm sections 36 provide open spaces or chambers surrounding the diaphragms 38, and such spaces are vented to the atmosphere either continuously by being open thereto or selectively as through manually operable valves 39. The valves 39 are respectively mounted in top closure sections 41 of the assemblies 11 and 12, and each valve 39 may be a normally closed valve of standard design such as the valves commonly used in automobile tires. As shown in FIG. 2, the valve 39 has a plunger 42 which must be depressed to open the valve; and a leaf spring 43 is mounted in the cap 41 so as to cantilever over the plunger 42 to facilitate depressing the same since the plunger may be more easily depressed by a person's thumb or finger via the spring than directly. The valves 39 are especially useful in keeping dirt from the chambers surrounding the diaphragms.

When the leveling apparatus is initially set up at a construction site or other location where points are to be leveled one against another, it may be advantageous (although not always necessary) to manually depress the valves 39 to open the same and thereby equalize the pressures within the gage assemblies by providing atmospheric pressure therewithin. The diaphragms 38 will then expand or contract as necessary, thereby equalizing the pressures therein with the contemporary value of the atmospheric pressure. Since the interiors of the diaphragms 38 respectively communicate (via the connectors 37) with the reservoir chamber 31 and observation tube 32, the pressures at the leveling surfaces of the liquid body are therefore equalized with the atmospheric pressure and with each other.

Following the pressure equalization step, if it is used, the two assemblies 11 and 12 may be positioned at the same elevation, usually next to each other, and if a level surface is not available, the assemblies can be hung or suspended from a nail or other convenient protrusion, each assembly being equipped with a bail 44 at the upper end thereof for this purpose. With the assemblies hanging or otherwise positioned at the same elevation, the exact position of the leveling surface of the body of liquid along the scale 33 can be observed, and if it departs significantly from the zero scale position, the location of the leveling surface along the scale should then be used as the zero or level position. In this respect, it may be noted that the leveling instrument may be affected somewhat by significant temperature changes owing to the thermal expansion and contraction of the liquid body and associated components of the instrument, especially the conduit 13 thereof. Thus, for example, on an exceedingly hot day the leveling surface of the liquid body may be slightly above the zero scale position, owing to the thermal expansion of the liquid, when the two assemblies are at precisely the same location. Analogously, the location of the leveling surface may be somewhat below the zero scale position on a very cold day when the assemblies are at the same elevation.

It should be noted, however, that departures from the zero scale position as a consequence of thermal expansions and contractions of the liquid body are very minimal for several reasons including selection of the liquid and material from which the conduit 13 is formed so that the thermal coefficients of expansion and contraction thereof are very similar. Thus, when the liquid tends to expand as a result of temperature elevations, the conduit 13 similarly expands and the ratios of expansion are such that very little change occurs in the exact zero position of the leveling surface of the body of liquid along the scale 33. A similar result is observed as respects the ratios of contraction of the liquid body and tubing or conduit 13. Also, the reservoir chamber 31 has a relatively large diameter referenced to that of the observation tube 32, wherefore temperature-induced expansions and contractions of the body of liquid tend to be accommodated along the large surface area of the body of liquid within the reservoir chamber 31, thereby resulting in only very small (generally insignificant) changes in the zero position of the liquid surface within the tube 32 and along the scale 33 associated therewith.

As concerns compatible materials for the liquid body and tube 13 so that the coefficients of thermal expansion and contraction thereof are similar, it has been found that a dilute solution of isopropyl alcohol serves satisfactorily as the body of liquid, and that several synthetic plastic materials are compatible therewith examples of which are "Lexan" sold by the General Electric Company and "Penite-RDO 7" sold by the Eastman Company. A solution of alcohol also has the advantage of relatively low viscosity which permits the system to respond quickly to changes in the relative positions of the assemblies 11 and 12, it is easily colored with dyes to permit ready visual observation thereof, and it will not freeze even at the subzero temperatures of northern winter climates. As previously indicated, any inaccuracies introduced by temperature changes are insignificant but in any case can be accommodated by noting the zero-level position of the liquid when the two assemblies 11 and 12 are placed at the same elevation for calibration purposes, and it will also be evident that the scale 33 can be made adjustable so that the zero position thereon can be accurately aligned with the elevation of the liquid within the tube 32 when the assemblies are calibrated.

The diaphragm chamber 36 of each assembly 11 and 12 is provided adjacent the lower end thereof below the connector 37 with a filler passageway or opening 45 that is threaded adjacent its outer end portion and is equipped thereat with a closure plug 46. There is very little evaporation or other loss of liquid from the assemblies 11 and 12 and conduit 13 interconnecting the same, but should loss occur, it can be replaced by adding the appropriate quantities of liquid through one or the other of the filler passageways 45. However, as long as the system remains intact and undamaged, substantially no fluid (either liquid or gas) can escape therefrom except for any minute permeability of the tube 13 and diaphragms 38 so that the liquid is maintained in the system as a single uninterrupted mass, and the plugs 46 therefore tend to remain in place for the life of the apparatus.

As previously suggested, each of the assemblies 11 and 12 is fabricated by joining a plurality of individual components that may be fixedly secured to each other in any appropriate manner, as for example, by solvent or sonic welding techniques. To facilitate alignment and interconnection of one component with another, the components are provided at opposite end portions thereof with mating configurations, as shown best in FIG. 3, which may take the form of an annular recess 47 defined within the interior adjacent the upper end of each component by a perimetric lip 48 thereat, and an inset shoulder 49 provided at the lower end of each component that seats within the recess 47 of the next successively lower component. The contiguous surfaces defined along the recesses 47 and shoulders 49 and along the upper edge of the lip 48 are then welded or otherwise affixed one to another so as to rigidly interrelate the successive components.

Figure 6:
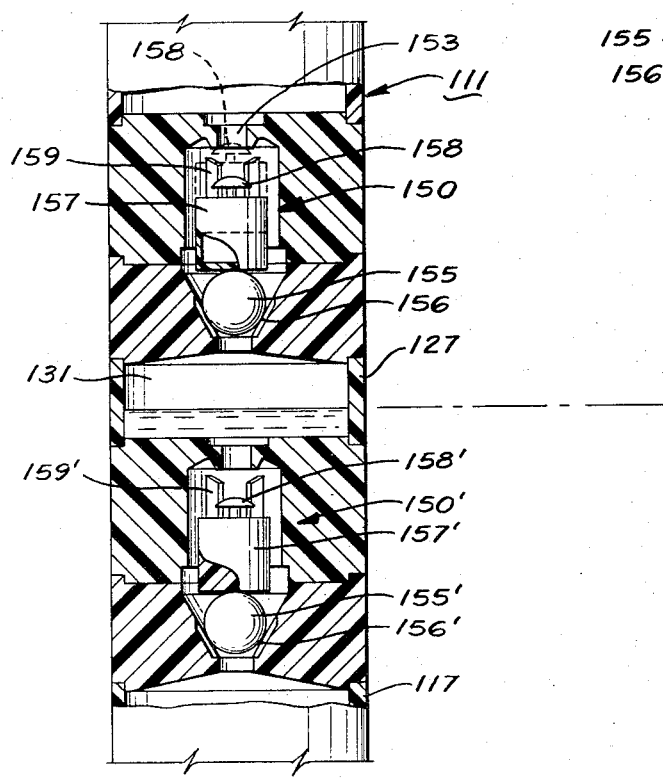
FIG. 6 is an enlarged, broken vertical sectional view of a modified reference component forming a part of leveling apparatus embodying the invention.
Figure 7:
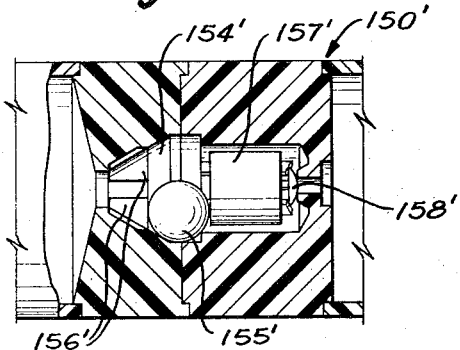
FIG. 7 is a broken vertical sectional view of a valve-equipped portion of one of the components illustrated in FIGS. 5 and 6 to show the function of the valve when the component is displaced into a horizontal position.
Figure 5:
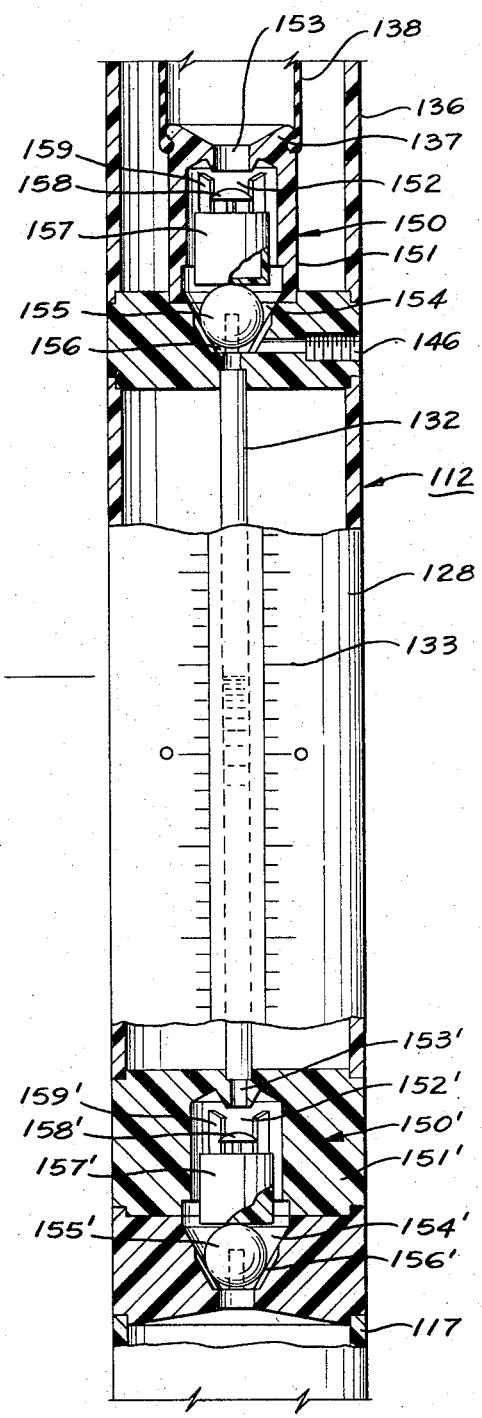
FIG. 5 is an enlarged, broken vertical sectional view (partly in elevation) of a modified indicator component forming a part of apparatus embodying the present invention.

A somewhat modified leveling instrument is illustrated in FIGS. 5 through 7, and so far as is applicable, the same numerals are used to designate respectively corresponding parts except that the order of the numerals has been increased to the 100 series in their application to the modification of FIGS. 5 through 7. In general terms, the modified instrument varies from the instrument heretofore described in the particular type of structure provided in each of the assemblies 111 and 112 for inhibiting escape of liquid therefrom to the ambient environment and for normally maintaining substantially ambient pressures upon the body of liquid within the flow passage means of the two assemblies. Further, the modified assembly also departs from that heretofore described as concerns the air-confinement means provided in each assembly for resisting escape of air into the flow passage means and tubing from the ambient pressures normally acting upon the body of liquid whenever the assemblies are displaced from the upright positions of use thereof.

Respecting first the structure for inhibiting escape of liquid to the ambient environment, the assemblies 11 and 12 heretofore described rely entirely upon the function of the diaphragms 38 which provide upper end closures for the flow passage means within the assemblies and also provide the means, at least in part, for establishing atmospheric pressure upon the body of liquid within the flow passage means. In the assemblies 111 and 112, such structure may include as a supplement to, or as an alternative, a diaphragm 138, a float valve structure generally denoted with the numeral 150. Considering this valve structure, and referring to the indicator assembly 112 in particular, the valve structure includes a casing 151 located within the diaphragm chamber 136 and defining an axially extending cylinder 152 therewithin. At its upper end, the cylinder 152 communicates with the interior of the diaphragm 138 through a valve port 153 providing a valve seat along the lower downwardly facing edge thereof. Adjacent its lower end, the chamber 152 terminates in an inverted, generally frustoconical chamber 154 in which is located a valve-actuating weight 155.

Whenever the assembly 112 is in the generally vertical operative position shown in FIG. 5, the weight 155 is gravity biased into the lowermost position thereof in which it rests upon a plurality of angularly spaced ribs 156 that establish flow paths therebetween which continuously cause the transparent flow tube 132 to be in open communication with the valve cylinder 152 irrespective of the orientation of the assembly 112. Located within the cylinder 152 for reciprocable displacements therealong is a float valve that includes a float 157 and a valve element 158 extending upwardly therefrom and adapted, in certain positions of the float valve, to sealingly engage the seat along the lower edge of the opening 153 so as to close the same. The float 157 is guided for axial displacement within the cylinder 152 by a plurality of angularly spaced ribs 159. In the usual instance, the weight of the float 157 and valve 158 carried thereby will cause the float valve to remain in the lowermost position thereof shown in FIG. 5 in which it rests upon the actuator weight 155. The float 157 is hollow, however, and is designed to be buoyant so that should the body of liquid rise within the tube 132 and into the valve chamber or cylinder 152, the float valve will float upwardly so as to cause the valve element 158 to sealingly engage the lower edge of the port 153, thereby closing the flow passage means at the upper end thereof to limit and substantially prevent ingress of liquid into the interior of the diaphragm 138.

Considering now the air-confinement means and again referring specifically to the assembly 112 shown in FIG. 5, the confinement means takes the form of valve structure which is essentially identical to the valve structure 150 heretofore described except that the equivalent of the float 157 is weighted so that it is not buoyant and will not float when immersed in the liquid body forming a part of the leveling instrument. Accordingly, the same numerals are used to identify the respectively corresponding components except that the primed form of such numerals are used in association with the air-confinement means. Thus, the valve structure is denoted in its entirety with the numeral 150', and it may be observed that at its upper end the opening or port 153' is somewhat smaller in cross section area than the port 153 and it communicates with the transparent tube 132 rather than with a diaphragm. Conversely, the frusto-conical chamber 154' communicates at its lower end with a separation chamber 117 rather than with the tube 132. Also, the casing 151' is comprised by an entire component and is not a relatively small casing located within the interior or a larger casing component.

The weighted actuators 155 and 155' are spherical, in the form shown, and may be metal balls in the nature of ball bearings. Accordingly, they are relatively heavy and tend to maintain the lowermost positions illustrated in FIG. 5 whenever the assembly 112 is upright, as shown, and irrespective of whether the weights are immersed in liquid. In such lowermost positions, the ribs 156 and 156' prevent the weights 155 and 155' from closing the lower inlet ports into the chambers 154 and 154' so that liquid may freely flow into such chambers and leave the same, flowing past the weights in each instance. Should the assembly 112 be displaced in an angular direction toward the horizontal disposition thereof illustrated in FIG. 7, gravity will cause the spherical weights 155 and 155' to roll outwardly along the respectively associated ribs 156 and 156' toward the associated openings 153 and 153'. As a consequence, the weights push the float elements 157 and 157' respectively associated therewith toward the ports 153 and 153' to close the same. The dimensional relationships are such that the ports are closed rapidly as soon as the assembly has been displaced angularly to the point that the lowermost ribs 156 and 156' have a downward inclination (see FIG. 7) which if the ribs have an angular inclination approximating 45° relative to the longitudinal axis of the associated chamber 152 and 152' will occur when the assembly has been displaced slightly more than 45° from the vertical position shown in FIG. 5.

Summarizing the function of the valve structures 150 and 150' then, each such valve structure is open whenever the assembly 112 is in a generally upright orientation, thereby enabling liquid to flow upwardly into and downwardly out of the transparent tube 132 without interference from the valve structure 150' since the element 157' thereof is not buoyant and the movement of liquid therepast does not tend to displace the same from the position shown in FIG. 5. The element 157 of the valve structure 150 is buoyant, however, so that should the body of liquid tend to completely fill the transparent tube 132 and rise upwardly through the chamber 154 and into the valve cylinder 152, the float 157 will rise with the liquid until the valve element 158 closes the port 153. As a result, substantially no liquid will enter the diaphragm 153 which could otherwise occur should the assembly 112 be lowered to a substantial extent relative to the assembly 111. Further, whenever the assembly 112 is displaced to any significant extent from the upright position shown in FIG. 5, the weights 155 and 155' will cause the respectively associated valves 158 and 158' to close the ports aligned therewith, thereby preventing further quantities of liquid both from entering and leaving the tube 132, which otherwise could occur if the assembly is placed in a generally horizontal position or is inverted into a generally upside down position.

Referring to FIG. 6, the assembly 111 is equipped with valve structures that are substantially identical, respectively, to the assemblies 150 and 150' heretofore described. Accordingly, the valve structures of the assembly 111 perform essentially the same functions in essentially the same manner as the valve structures 150 and 150', and for this reason, the same numerals are used to identify the respectively corresponding valve structures in their association with the assembly 111. For clarity, it may be observed that the casing 151 defining the valve cylinder 152 of the assembly 111 takes a somewhat different physical form than the casing 151 heretofore described and is generally more similar in appearance to the casing 151'. Irrespective of this physical difference, however, the function is the same in each of the assemblies and the same numerals are used with the valve structure 150 in each of the assemblies 111 and 112.

It has been found that it is not necessary that the assemblies 111 and 112 be provided with separation chambers, as previously described, because of the operation of the valve structures 150 and 150'. Nevertheless, separation chambers 117 are employed with the assemblies 111 and 112 in the particular form thereof shown in the drawings.

The reservoir component 127 and reservoir 131 defined thereby of the reference assembly 111 are somewhat shorter in an axial or longitudinal sense than the reservoir 27 and chamber 31 thereof provided by the reference assembly 11 heretofore described. Nevertheless, and as previously explained, the volumetric capacity of the chamber 131 is very large relative to that of the tube 132 of the assembly 112 so that changes in the volume of the body of liquid caused by thermal expansions and contractions thereof will not materially change the zero-position of such body of liquid within the tube 132 since, for the most part, any such changes will be taken up in the large cross sectional area of the reservoir chamber 131.

The reference assembly 111 may or may not be equipped with a diaphragm 138, and in the form illustrated in FIG. 6 is without such diaphragm. In the event of the configuration for a valve structure 150, as shown in FIG. 5, in which the diaphragm 138 is omitted, it will be advantageous to prevent escape of liquid into the space generally circumjacent the casing 151 should any liquid rise through the port 153 before the valve 158 seals the same. The modified construction illustrated in FIG. 8 is intended to prevent any such wasteful escape of liquid (which would destroy the accuracy of the zero-scale position of the liquid when the components 111 and 112 are aligned), and escape is prevented by including an inverted generally frusto-conical partition 160a extending between the upper edge of the casing 151a and the circumjacent wall of the component 136a. Thus, the partition 160a effectively subdivides the volume within the component 136a into a substantially closed space 161a below the partition and a larger space 162a above the partition. Accordingly, any liquid rising upwardly through the cylinder 152a and port 153a before the port is closed by a valve associated therewith (not illustrated in FIG. 8) will be funneled downwardly by the partition 160a and into the port 153a to return to the body of liquid within the assemblies 111 and 112 so as to again become an integral part thereof.

Use of the leveling instrument is evident from the previous discussion, and prior to any use if extreme accuracy is required, the two assemblies are placed at the same elevation, the valve 39 of the two assemblies depressed (provided that the assemblies are equipped with valves 39) to equalize the pressures within the components 36 (or the corresponding components of the assemblies 111 and 112 or the chamber 162a of the component 136a), and the precise position of the liquid level along the scale 33 noted if it does not align with the zero-scale position since the location of the liquid level along the scale if the precise or accurate indication of a true level condition. The reference assembly is then hung or otherwise placed at the reference elevation, and the indicator assembly positioned at the location to be leveled with respect to the reference location. If the indicator assembly is too high, the liquid level along the scale will appear below the zero-reference position, and vice versa, so that the indicator assembly is simply raised or lowered, as the case may be, to accurately align the liquid level in the true transparent tube 32 at the true zero-level position. This procedure is repeated at each location at which a level condition must be established.

In certain instances it may be desirable to use a plurality of indicator assemblies 12 or 112 with a common reference assembly so that a plurality of points can be leveled concurrently with respect to a single reference location. It will be appreciated that in this event, a single reservoir within the reference assembly will effectively supply and accommodate such plurality of indicator assemblies which will each be connected to the reference assembly in any convenient manner as for example, by having a multiple-outlet connector component 14 at the base of the reference component and to which a plurality of tubes 13 are connected to respectively couple the various indicator assemblies to the reference assembly.

In some situations it may be advantageous to reduce the cost of the instrument by simplifying the construction thereof as, for example, by omitting the diaphragms and the air separation components from each assembly. Further, the liquid used within any such simplified instrument could be water so that any escape thereof would create no problems and could be readily replaced. In any such simplified instrument, the valves 39 might also be omitted and the chambers associated therewith simply being open to atmosphere at all times; and in any case, if desired, either with or without the diaphragms, the valves 39 may be omitted and the chambers vented directly to atmosphere, sometimes through apertures provided in a resilient cover enclosing the upper end of each assembly.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. Leveling apparatus for use in establishing the level of one location with respect to another separated therefrom, comprising: a plurality of static-pressure tube assemblies respectively provided with flow passage means therein adapted to be oriented in a generally upright position during use of said apparatus; one of said assemblies being a reference component adapted to be disposed at the one such location with respect to which the other is to be leveled, and another of said assemblies being an indicator component adapted to be disposed at the location to be leveled and including visual observation means enabling the relative levels of such locations to be visually determined; flexible tubing extending between said assemblies in communication with said flow passage means therein to flow interconnect the same; a body of liquid within said tubing and flow passage means to provide the leveling medium for said apparatus; and structure provided in each of said assemblies for inhibiting escape of liquid therefrom to the ambient environment and for normally maintaining substantially ambient pressures upon said body of liquid within said flow passage means, and air-confinement means provided in each of said assemblies for resisting, whenever said assemblies are displaced from the upright position of use thereof, ingress into said tubing of air normally acting upon said body of liquid, each of said air-confinement means comprising an air separation section disposed along the associated flow passage means and providing a collection space into which air bubbles tend to rise and collect so as to remain separated from said body of liquid whenever said assemblies are displaced from the upright positions of use thereof.

2. The leveling apparatus of claim 1 in which each of said separation sections includes an inner flow tube and an outer entrapment chamber generally circumjacent the same, said flow tube being open at its lower end and closed at its upper end and provided adjacent the closed upper end thereof with a relatively restricted opening defining communication between the interior of the flow tube and circumjacent entrapment chamber, said entrapment chamber defining the aforementioned space within which air bubbles tend to collect whenever said assemblies are displaced from the upright positions of use thereof.

3. The leveling apparatus of claim 2 in which said structure inhibiting escape of liquid includes a flexible diaphragm defining a chamber therewithin and being in open communication with the associated flow passage means and forming an hermetic seal adjacent one end thereof.

4. The leveling apparatus of claim 3 in which each of said assemblies defines a pressure space about the associated diaphragm adapted to communicate with the ambient environment to provide the aforementioned ambient pressures upon said body of liquid through said diaphragm.

5. The leveling apparatus of claim 4 in which each of said assemblies is equipped with a manually operable valve in association with the pressure space thereof, the pressure within said space being adjusted by manipulation of the valve.

6. The leveling apparatus of claim 1 in which said structure inhibiting escape of liquid includes a float valve structure having a port adapted to communicate with abmient pressures and a float equipped valve element movable between an open position in which said port is unobstructed and a closed position in which movement of liquid through said port is restricted, said float being buoyant in said body of liquid and operative to displace said valve element into closing relation with said port whenever the body of liquid tends to rise about the float.

7. The leveling apparatus of claim 6 in which said float valve structure further comprises a weighted actuator movable under the influence of gravitational forces between a normally inoperative position whenever the associated assembly is upright and an active position forcing said valve element into the closed position thereof whenever the associated assembly is displaced through a predetermined angular distance from the upright position thereof.

8. The leveling apparatus of claim 1 in which said air-confinement means includes a gravity-biased valve structure having a port adapted to establish communication between the associated flow passage means and tubing and having also a weighted valve element movable between a lower open position in which said port is unobstructed and an upper closed position in which movement of liquid through said port is restricted, said weighted valve element being sufficiently heavy relative to the density of said body of liquid that it remains in its lower open position when immersed therein.

9. The leveling apparatus of claim 8 in which said gravity-biased valve structure further comprises a weighted actuator movable under the influence of gravitational forces between a normally inoperative position whenever the associated assembly is upright and an active position forcing said weighted valve element into the closed position thereof whenever the associated assembly is displaced to a predetermined angular distance from the upright position thereof.

10. The leveling apparatus of claim 9 in which said structure inhibiting escape of liquid includes a float valve structure having a port adapted to communicate with ambient pressures and a float equipped valve element movable between an open position in which said port is unobstructed and a closed position in which movement of liquid through said port is restricted, said float being buoyant in said body of liquid and operative to displace said valve element into closing relation with said port whenever the body of liquid tends to rise about the float.

11. The leveling apparatus of claim 10 in which each of said valve structures further comprises a weighted actuator movable under the influence of gravitional forces between a normally inoperative position whenever the associated assembly is upright and an active position forcing the associated valve element into the closed position thereof whenever the associated assembly is displaced through a predetermined angular distance from the upright position thereof.

12. The leveling apparatus of claim 9 in which said structure inhibiting escape of liquid includes a flexible diaphragm defining a chamber therewithin and being in open communication with the associated flow passage means and forming an hermetic seal adjacent one end thereof.

13. The leveling apparatus of claim 12 in which each of said assemblies defines a pressure space about the associated diaphragm to communicate with the ambient environment to provide the aforementioned ambient pressures upon said body of liquid through said diaphragm.

14. The leveling apparatus of claim 13 in which each of said assemblies is equipped with a manually operable valve in association with the pressure space thereof, the pressure within said space being adjusted by manipulation of the valve.

* * * * *